United States Patent
Gaertner

(10) Patent No.: US 10,281,042 B2
(45) Date of Patent: May 7, 2019

(54) CYLINDER DRUM OF A HYDROSTATIC AXIAL PISTON MACHINE HAVING A WEAR-RESISTANT LAYER

(71) Applicant: Robert Bosch GmbH, Stuttgart (DE)

(72) Inventor: Bernd Gaertner, Schnuerpflingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/679,711

(22) Filed: Aug. 17, 2017

(65) Prior Publication Data
US 2017/0343107 A1 Nov. 30, 2017

Related U.S. Application Data

(62) Division of application No. 14/571,193, filed on Dec. 15, 2014.

(30) Foreign Application Priority Data

Dec. 16, 2013 (DE) .................. 10 2013 226 091

(51) Int. Cl.
| | | |
|---|---|---|
| *C23C 8/34* | (2006.01) | |
| *F16J 10/04* | (2006.01) | |
| *F04B 1/14* | (2006.01) | |
| *F04B 1/20* | (2006.01) | |
| *F04B 53/16* | (2006.01) | |

(52) U.S. Cl.
CPC .............. *F16J 10/04* (2013.01); *C23C 8/34* (2013.01); *F04B 1/143* (2013.01); *F04B 1/2035* (2013.01); *F04B 53/162* (2013.01); *F04B 53/166* (2013.01); *F05C 2203/0813* (2013.01); *F05C 2251/14* (2013.01)

(58) Field of Classification Search
CPC ...... C23C 8/32; C23C 8/34; C23C 8/30; F16J 10/04; F04B 53/166; F04B 1/2035; F04B 1/143; F04B 53/162
See application file for complete search history.

(56) References Cited

U.S. PATENT DOCUMENTS

| | | | |
|---|---|---|---|
| 2012/0048427 A1 | 3/2012 | Kubota | |
| 2014/0298988 A1* | 10/2014 | Smith | F01B 1/0603 |
| | | | 92/178 |

FOREIGN PATENT DOCUMENTS

| | | |
|---|---|---|
| CN | 102758773 A | 10/2012 |
| DE | 37 18 240 C1 | 1/1988 |
| DE | 40 27 011 A1 | 3/1992 |
| DE | 93 03 929 U1 | 7/1993 |
| DE | 201 02 352 U1 | 8/2001 |
| DE | 10 2007 027 933 B4 | 1/2008 |
| DE | 10 2009 056 875 B4 | 6/2011 |
| DE | 10 2011 053 253 A1 | 3/2013 |
| DE | 10 2012 212 426 B3 | 8/2013 |
| EP | 0733720 A1 | 9/1996 |
| EP | 1 122 331 B1 | 3/2003 |
| EP | 1 122 330 B1 | 10/2004 |
| WO | 01/42528 A1 | 6/2001 |

OTHER PUBLICATIONS

Dr. Joachim Boßlet, Tenifer®-/QPQ®-Verfahren, Durferrit GmbH, V.5, Nov. 2009, pp. 1-20.

* cited by examiner

*Primary Examiner* — Jessee R Roe
(74) *Attorney, Agent, or Firm* — Maginot, Moore & Beck LLP

(57) ABSTRACT

A method is provided for forming wear-resistant layer on the surface of cylinder bores a cylinder drum of a hydrostatic axial piston machine within which a respective piston is moved in a manner subject to intensive wear. The cylinder bores are gas nitrocarburized in two stages to minimize the wear and include a thin uniform connecting layer that has a thickness of 4 to 16 μm and a comparatively thick underlying diffusion layer.

5 Claims, 1 Drawing Sheet

CYLINDER DRUM OF A HYDROSTATIC AXIAL PISTON MACHINE HAVING A WEAR-RESISTANT LAYER

This application is a divisional of pending U.S. application Ser. No. 14/571,193, filed on Dec. 15, 2014, which further claims priority under 35 U.S.C. § 119 to patent application no. DE 10 2013 226 091.1, filed on Dec. 16, 2013 in Germany, the disclosures of both of which are incorporated herein by reference in its entirety.

BACKGROUND

The disclosure relates to a hydrostatic axial piston machine having a cylinder drum which has a sliding surface and therefore together with another component forms a sliding pair.

In axial piston machines, a cylinder drum rotates in relation to a stationary disk-shaped control or distributor plate. Cylinder (bores) are formed in the cylinder drum, and in these cylinder (bores) pistons perform a lifting movement along a lifting direction directed axially in relation to the axis of rotation of the cylinder drum. In the case of an oblique-axis construction, a drive shaft to which the pistons are coupled is set obliquely in relation to said lifting direction. In the case of a swash plate construction, a swash plate to which the pistons are coupled is set obliquely in relation to said lifting direction. The cylinders are connected alternately to a high-pressure side and a low-pressure side of the machine via the distributor plate. In this case, for example, the cylinder drum and the pistons guided therein form a sliding pair within the meaning of the present document.

It is known from the prior art to nitrocarburize the components of sliding pairs and to thereby produce a wear-resistant layer. In this heat treatment method, the chemical composition of the marginal layer is changed, such that the strength is increased and the wear behavior is improved. It is known in this respect to carry out the nitrocarburizing in gas or in a salt bath.

The documents EP 1 122 330 B1 and EP 1 122 331 B1 each disclose a method for nitrocarburizing in gas.

The document WO/0142528 A1 discloses a method for nitrocarburizing an injection nozzle in a salt bath until a connecting layer has reached a thickness of up to 3 µm. Thereafter, the injection nozzle is further treated in a gas nitriding method. The aim of this is to keep the connecting layer thin or in gas nitriding to reduce the size thereof again.

It is an object of the disclosure to provide a cylinder drum of a hydrostatic axial piston machine which forms a sliding pairing with at least one other component—in particular with a plurality of pistons—and the wear-resistant layer of which is more durable and more resistant to failure even at high system pressures and resulting high frictional forces, such that the entire axial piston machine has a high service life.

SUMMARY

This object is achieved by a cylinder drum having the features of the disclosure.

The cylinder drum is suitable as a component of a hydrostatic axial piston machine and has a wear-resistant layer. According to the disclosure, the wear-resistant layer is produced by nitrocarburizing in a salt bath or by nitrocarburizing in gas and has a comparatively thin ductile connecting layer, the thickness of which is, for example, 4 to 16 µm. As a result, the cylinder drum withstands a higher Hertzian stress compared to embodiments with a wear-resistant layer which has been produced by a conventional nitriding or nitrocarburizing method. The abrasive and adhesive wear resistance is retained in the process. The small changes in dimension make it possible to achieve a relatively high process reliability with low tolerances.

According to a variant (a), the wear-resistant layer is produced by nitrocarburizing in a salt bath and the connecting layer has a thickness of 10 to 16 µm.

According to a variant (b), the wear-resistant layer is produced by gas nitrocarburizing and the connecting layer has a thickness of 5 to 12 µm.

According to a variant (c), the wear-resistant layer is produced by nitrocarburizing in a salt bath and the connecting layer has a thickness of 4 to 8 µm.

In a first application, the cylinder drum is a bushingless swash plate cylinder drum.

In a second application, the cylinder drum is an oblique-axis cylinder drum.

It is particularly preferable if the wear-resistant layer has a comparatively thick diffusion layer. By way of example, the thickness of the diffusion layer can be at least 50 µm.

If the wear-resistant layer is produced by gas nitrocarburizing—e.g. according to variant b—it is particularly preferable if this is effected in two stages, the first stage comprising a comparatively low treatment temperature and a comparatively long treatment duration, and the second stage comprising an increase in the carbon content of the connecting layer by the addition of carbon donors at a comparatively high treatment temperature. The carbon content of the connecting layer is increased as a result. Compared to the prior art, the two-stage gas nitrocarburizing makes it possible to achieve reduced changes in dimension of the component and a higher process reliability and a higher operational reliability of the cylinder drum, in particular in the case of components with low tolerances.

In this case, a carbon donor can already be added in the first stage.

It is particularly preferable if initially more nitrogen than in an undersaturated furnace atmosphere has been added. As a result, blotchiness of the cylinder drum is avoided by a uniform layer formation on the entire surface.

It is furthermore particularly preferable if then less nitrogen than in a supersaturated furnace atmosphere has been added. This avoids excessive growth of the connecting layer and therefore the embrittlement thereof.

BRIEF DESCRIPTION OF THE DRAWINGS

An exemplary embodiment according to the disclosure of a cylinder drum is shown in the drawings. The disclosure will now be explained in more detail with reference to the figures in the drawings, in which.

DETAILED DESCRIPTION

Figure 1:
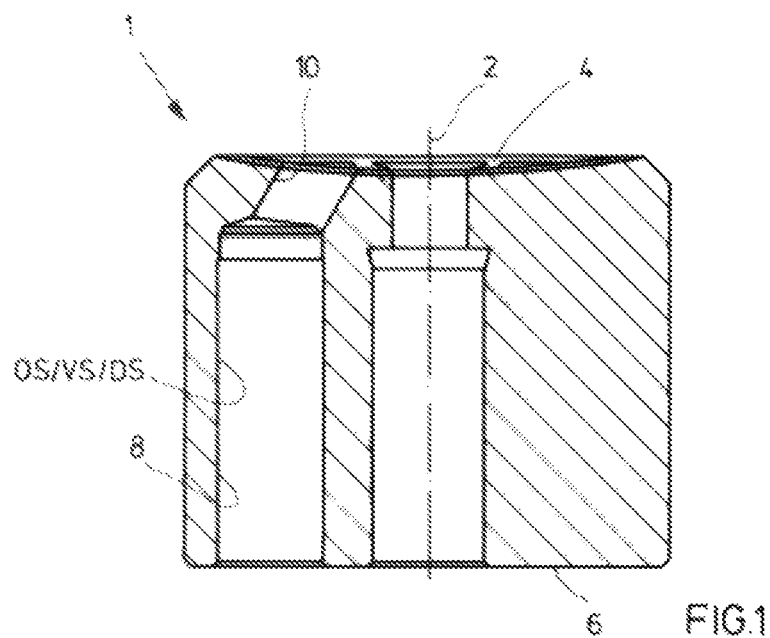
FIG. 1 shows a longitudinal section through the cylinder drum according to the disclosure.

FIG. 1 shows a cylinder drum 1 of the exemplary embodiment of the axial piston machine according to the disclosure in an oblique-axis construction in a sectional illustration. It has an approximately circular cylindrical shape and, during operation of the axial piston machine, rotates about its longitudinal axis 2. The cylinder drum 1 has a spherical shape on one end face 4 and is pressed with this end face 4 against a distributor disk. The other end face 6 faces towards a flange of a drive shaft, the cylinder drum 1 being set opposite said flange in the case of a constant-displacement machine and being settable at various angles in relation to said flange in the case of a variable-displacement machine.

Figure 2:
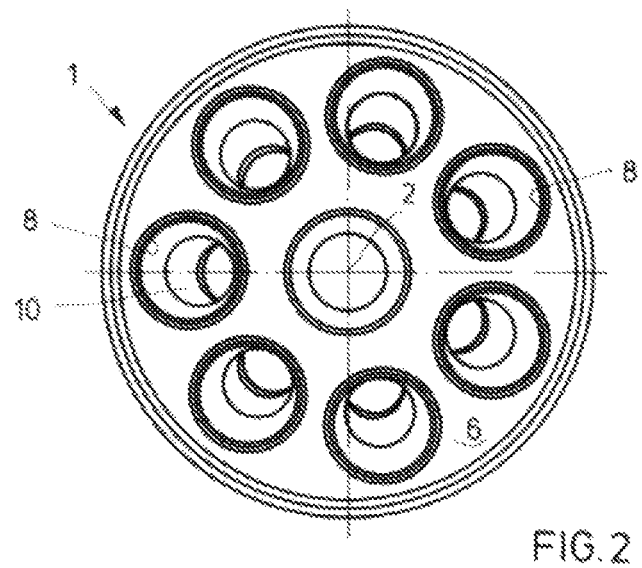
FIG. 2 shows the cylinder drum as shown in FIG. 1 in an elevated view.

FIG. 2 shows an elevated view of the end face 6 of the cylinder drum 1 which faces towards the flange or the shaft. A plurality of cylinder bores 8 are introduced on the circumference thereof in a uniformly distributed manner and extend over a large part of the length of the cylinder drum 1.

With reference to FIG. 1, in the region of the spherically shaped end face 4 each cylinder bore has a through bore 10, via which the cylinder bore 8 is alternately connected to a high-pressure kidney and a low-pressure kidney of the distributor disk as it revolves about the longitudinal axis 2. A piston is guided in each cylinder bore 8 and is hinged on its side remote from the cylinder drum 1 to the flange, the lifting movement of the piston in the cylinder bore being produced during a joint revolution owing to the oblique position of the flange. Therefore, each piston forms a sliding pairing with the cylinder drum 1—more precisely with the cylinder bore 8.

According to the disclosure, the cylinder drum 1 shown in FIGS. 1 and 2 was nitrocarburized in a furnace with gas or in a salt bath after its manufacture. An oxide layer OS, an underlying connecting layer VS and an underlying diffusion layer DS were thereby produced in particular in the region of the lateral surface of the cylinder bore 8, these layers serving as a wear-resistant layer for the cylinder bore 8. In the variant in which gas nitrocarburizing is carried out, the connecting layer VS has a thickness of 5 to 12 μm, while the underlying diffusion layer DS has a thickness of at least 50 μm. In this case, it is possible to employ a two-stage method, in the first stage of which the treatment was carried out with a comparatively long duration and at a comparatively low temperature of 500 to 510° C. In the second stage, the carbon content of the connecting layer (VS) was increased by the addition of carbon donors at a comparatively high treatment temperature.

The disclosure discloses a cylinder drum of a hydrostatic axial piston machine, wherein a plurality of cylinder bores, in each of which a piston is moved in a manner subject to intensive wear, are introduced into the cylinder drum. The cylinder bores of the cylinder drum are nitrocarburized in a salt bath or in gas to minimize the wear, a thin uniform connecting layer having a thickness of 4 to 16 μm and a comparatively thick underlying diffusion layer being provided.

LIST OF REFERENCE SIGNS

1 Cylinder drum
2 Longitudinal axis
4 End face
6 End face
8 Cylinder bore
10 Through bore
DS Diffusion layer
OS Oxide layer
VS Connecting layer

What is claimed is:

1. A method of forming a wear-resistant layer on the surface of a cylinder bore within a cylinder drum of a hydrostatic axial piston machine, the method comprising gas nitrocarburizing the surface of the cylinder bore in two stages:
    the first stage forming an oxide layer and a diffusion layer at the surface, the diffusion layer having a thickness of at least 50 μm, the oxide layer and the diffusion layer separated by a ductile connecting layer having a thickness of 4 to 16 μm, the first stage comprising gas nitrocarburizing at a first treatment temperature and a first treatment duration; and
    the second stage comprising further gas nitrocarburizing while increasing the carbon content of the connecting layer by the addition of carbon donors at a second treatment temperature relative to the first stage and at a second treatment duration,
    wherein the first treatment duration is longer than the second treatment duration, and
    wherein the first treatment temperature is 500 to 510° C. and the second treatment temperature is greater than the first treatment temperature.

2. The method according to claim 1, wherein the connecting layer is formed with a thickness of 5 to 12 μm.

3. The method according to claim 1, wherein the treatment temperature of the second stage is greater than 510° C.

4. The method according to claim 1, further comprising adding during the gas nitrocarburizing stages more nitrogen than in an undersaturated furnace atmosphere.

5. The method according to claim 4, wherein the step of adding nitrogen includes adding during the gas nitrocarburizing stages less nitrogen than in a supersaturated furnace atmosphere.

* * * * *